United States Patent [19]

Grigsby et al.

[11] Patent Number: 4,725,297
[45] Date of Patent: Feb. 16, 1988

[54] SPLICING OPTICAL FIBER RIBBON METHOD AND APPARATUS

[75] Inventors: Richard Grigsby; Edward Z. Kaczmarski, both of London, England

[73] Assignee: BICC Public Limited Company, London, England

[21] Appl. No.: 42,783

[22] Filed: Apr. 27, 1987

[30] Foreign Application Priority Data

May 9, 1986 [GB] United Kingdom ............... 8611361

[51] Int. Cl.⁴ .................... C03B 37/10; G02B 5/14
[52] U.S. Cl. .................................... 65/4.2; 65/4.21; 65/11.1; 350/96.21
[58] Field of Search .............. 65/2, 4.2, 4.21, 4.3, 65/10.2, 11.1, 36, 42, 58; 350/96.21

[56] References Cited

U.S. PATENT DOCUMENTS

| | | | |
|---|---|---|---|
| 4,028,162 | 6/1977 | Cherin et al. | 65/4.21 X |
| 4,248,499 | 2/1981 | Liertz et al. | 350/96.21 |
| 4,345,137 | 8/1982 | Mignien | 65/4.21 X |
| 4,415,347 | 11/1983 | Malinge et al. | 65/4.21 |

FOREIGN PATENT DOCUMENTS 2001952 2/1979 United Kingdom ............... 65/4.21

Primary Examiner—Robert L. Lindsay
Attorney, Agent, or Firm—Parkhurst & Oliff

[57] ABSTRACT

To enable sequential fusion splicing of the optical fibers of two lengths of optical fiber ribbon, the fusion splicer has, on each side of the fusion station, means for arranging the exposed end portions of the optical fibers of each ribbon, over a limited length between the position at which they are lightly clamped and the cut back end of the ribbon, to follow a curved path whose centers of curvature lie on a line extending transversely of the ribbon. Preferably, one of these means is an externally screw threaded rod which extends under and transversely of the optical fibers of one of the ribbons and in the grooves of which the optical fibers are arranged to lie. By unscrewing the rod, each lightly clamped optical fiber in turn drops from the rod and straightens so that its end to be fusion spliced protrudes beyond the ends of the other optical fibers of the ribbon. Fusion splicing of the pair of aligned optical fibers is then effected. The risk that any other pair of optical fibers of the ribbons will be prematurely partially fused together during fusion splicing of a pair of optical fibers is substantially reduced.

10 Claims, 2 Drawing Figures

SPLICING OPTICAL FIBER RIBBON METHOD AND APPARATUS

This invention relates to effecting permanent end-to-end fusion splices between the optical fibers of two lengths of optical fiber ribbon.

When effecting fusion splices between the optical fibers of two lengths of optical fiber ribbon, it is desirable that the end of each length of optical fiber ribbon at which the fusion splices are to be made are so cut that the end faces of the optical fibers lie in a substantially common plane which extends radially of the longitudinal axes of the fibers. In practice, this is difficult to achieve and it is often the case that the end faces of the optical fibers lie in a plurality of parallel planes, each of which is radial to the longitudinal axes of the optical fibers. As a consequence, when the pairs of optical fibers of the two lengths of optical fiber ribbon are arranged in axial alignment with their end faces in approximately abutting relationship prior to effecting of the fusion splices, while the end faces of one or more than one of the pairs of optical fibers may be abutting, the end faces of other of the pairs of optical fibers will be so spaced apart that it is difficult, if not impossible, to effect satisfactory fusion splices to all the pairs of optical fibers.

It is an object of the present invention to provide an improved method of effecting permanent end-to-end fusion splices between the optical fibers of two lengths of optical fiber ribbon, which method can be readily effected when the end faces of the optical fibers of one or each optical fiber ribbon do not lie in a substantially common plane.

According to the invention, the improved method comprises the steps of stripping an end portion of each length of optical fiber ribbon to provide exposed end portions of the optical fibers; arranging the exposed end portions of the optical fibers of the two lengths of optical fiber ribbon in substantially axial alignment and with the ends to be fusion spliced positioned at the fusion splicing station; so clamping the exposed end portions of the optical fibers of each length of optical fiber ribbon that the exposed end portion of each optical fiber can be caused to move lengthwise to a limited extent relative to the exposed end portions of the other optical fibers of said length of optical fiber ribbon; arranging the exposed end portions of the optical fibers of each optical fiber ribbon, over a limited length between the position at which they are so clamped and the cut back end of the optical fiber ribbon, to follow a curved path whose centers of curvature lies on a line extending transversely of said length of optical fiber ribbon; causing the exposed end portion of an outermost optical fiber of one of the lengths of optical fiber ribbon to straighten and follow a substantially rectilinear path so that its end to be fusion spliced protrudes beyond the ends of the exposed end portions of the other optical fibers of said optical fiber ribbon; arranging said protruding end of the exposed end portion of said optical fiber of said length of optical fiber ribbon in substantially axial alignment with and with its end face substantially abutting the end face of the corresponding optical fiber of the other length of optical fiber ribbon; effecting a fusion splice between the abutting ends of said aligned optical fibers; and repeating the latter three steps for each immediately adjacent pair of exposed end portions of optical fibers of said lengths of optical fiber ribbon in turn until all the optical fibers of the optical fiber ribbons have been fusion spliced.

By virtue of the fact that the exposed end portions of the optical fibers of the two lengths of optical fiber ribbon are so clamped that the exposed end portions of each optical fiber is capable of limited movement in a lengthwise direction relative to the exposed end portions of the other optical fibers and of the fact that a limited length of exposed end portions of the optical fibers of said other length of optical fiber ribbon, between the position at which they are so clamped and the cut back end of the optical fiber ribbon, follow a curved path whose centers of curvature lie on a line extending transversely of the optical fiber ribbon, the fusion spliced pair or the fusion spliced pairs of optical fibers is or are free to move to a limited extent lengthwise relative to the pairs of optical fibers still to be spliced and so will not prevent each subsequent pair of optical fibers in turn from being spliced by the aforesaid three steps of the improved method hereinbefore described.

Preferably, said limited lengths of the exposed end portions of the optical fibers of said one length of optical fiber ribbon are arranged to follow a curved path whose centers of curvature lies on a line extending transversely of the optical fiber ribbon by introducing under said limited lengths of the exposed end portions of the optical fibers in a direction transversely of the optical fiber ribbon an elongate member which has a convexly curved surface over and at least partially around which the exposed end portions of the optical fibers pass and which can be moved incrementally in the direction of its length and transversely of the optical fiber ribbon in such a way that each optical fiber in turn can be caused to drop off an end of the elongate member and adopt a substantially straight and rectilinear path so that its end to be fusion spliced protrudes beyond the ends of the exposed end portions of the other optical fibers. Incremental movement of the elongate member in a direction transverse of said one length of optical fiber ribbon is preferably effected by a screw threaded arrangement.

Clamping of the exposed end portions of the optical fibers of each optical fiber ribbon preferably is effected by arranging for the exposed end portions to lie in a plurality of longitudinally extending substantially parallel grooves in the upper surface of a base plate of a material having a low co-efficient of friction, e.g. silicon, and by retaining them thereon by a spring-loaded pressure pad, e.g. of a rubber-like material, having a surface which engages the optical fibers and which is of a material having a low co-efficient of friction, e.g. polytetrafluoroethylene. In this case, the elongate member having a convexly curved surface over which the exposed end portions of the optical fibers of said length of optical fiber ribbon lie, preferably comprises a rod of circular cross-section having in its surface a single helically extending groove within and partially around turns of which the exposed end portions of the optical fibers are arranged to lie. The turns of the groove in the rod will be in substantial alignment with the grooves in the base plates of the clamping means.

The limited lengths of the exposed end portions of the optical fibers of the other length of optical fiber ribbon are caused to follow a curved path whose centers of curvature lie on a line extending transversely of the optical fiber ribbon preferably by arranging for said limited lengths of the exposed end portions, between the position at which the exposed end portions are so clamped and the cut back end of the optical fiber ribbon, to lie in an unsupported smooth catenary curve.

Preferably, each pair of optical fibers in turn is arranged in axial alignment with their neighbouring end faces abutting by the method described in the specification of our co-pending Patent Application No: 8608282.

The invention also includes fusion splicing apparatus incorporating means for effecting a permanent end-to-end fusion splice between each pair of optical fibers, in turn, of two lengths of optical fiber ribbon by the improved method hereinbefore described.

The invention is further illustrated by a description, by way of example, of the preferred apparatus for and method of effecting a permanent end-to-end fusion splice between each pair of optical fibers, in turn, of two lengths of optical fiber ribbon, with reference to the accompanying diagrammatic drawing.

Figure 1:
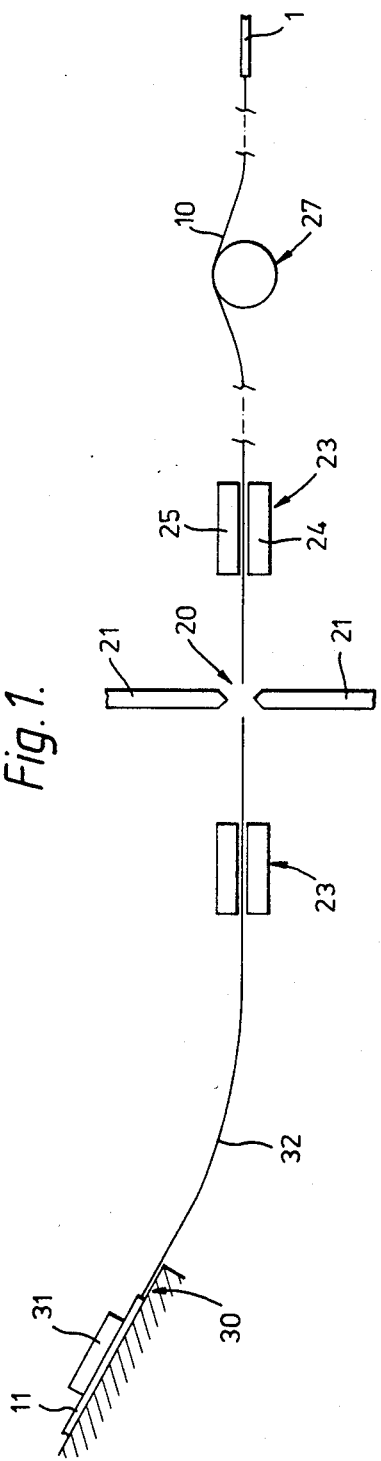
FIGS. 1 and 2, respectively, are side and plan view, of the preferred apparatus.

Referring to the drawing, the preferred fusion splicing apparatus includes a splicing station 20 having a pair of elongate electrodes 21 by means of which pairs of optical fibers of two lengths of optical fiber ribbon can be fusion spliced, in turn. Positioned on each side of the splicing station 20, is an optical fiber clamping device 23 comprising a base plate 24 of silicon having in its upper surface a plurality of longitudinally extending parallel grooves and, for retaining a plurality of optical fibers of an optical fiber ribbon in the grooves, a spring-loaded pressure pad 25 of a rubber-like material having an undersurface of polytetrafluoroethylene which will engage the optical fibers. Positioned beyond one of the clamping devices 23 remote from the splicing station 20 is a rod 27 of circular cross-section having in its surface a single helically extending groove 28 and, at one of its ends, a knurled operating knob 29. As will be seen, the rod 27 extends in a direction normal to the grooves in the upper surfaces of the base plates 24 of the clamping devices 23 and, by appropriate rotation of the knurled knob 29, can be caused to move incrementally in either direction normal to the grooves. Beyond the other clamping device 23 remote from the splicing station 20 is a support 30 which is inclined at an acute angle to the upper surface of the fusion splicing apparatus and, associated with the inclined support, a clamp 31 by means of which an optical fiber ribbon can be clamped to the upper surface of the inclined support.

In using the preferred apparatus illustrated in the drawing to effect permanent end-to-end fusion splices between the optical fibers of two lengths of optical fiber ribbon 1,11, an end portion of each length of optical fiber ribbon is stripped to provide exposed end portions 2,3,4 . . . and 12,13,14 . . . of the optical fibers. The exposed end portions 2,3,4 . . . and 12,13,14 . . . of the two lengths of optical fiber ribbon 1,11 are arranged in approximately axial alignment and with the ends to be fusion spliced positioned at the fusion splicing station 20. The exposed end portions 2,3,4 . . . and 12,13,14 . . . of the optical fibers of each length of optical fiber ribbon 1,11 are arranged to lie in the longitudinally extending parallel grooves in the upper surfaces of the base plates 24 of the clamping devices 23 and are clamped therein by the spring-loaded pressure pads 25. By virtue of the fact that the base plates 24 are made of silicon and the undersurfaces of the pressure pads are made of polytetrafluoroethylene, the exposed end portion of each optical fiber of each optical fiber ribbon can move lengthwise to a limited extent relative to the exposed end portions of the other optical fibers of the length of optical fiber ribbon. In their passage from the cut back end of the optical fiber ribbon 1 to the clamping device 23, the exposed end portions 2,3,4 . . . of the optical fibers of the optical fiber ribbon lie in turns of the single helically extending groove 28 of the transversely movable rod 27 so that, between the cut back end of the optical fiber ribbon and the clamping device, the exposed end portions of the optical fibers follow a curved path 10 whose centers of curvature lie on a line extending transversely of the length of optical fiber ribbon (see FIG. 1). The cut back end of the optical fiber ribbon 11 is clamped to the upper surface of the inclined support 30 by the clamp 31 and the exposed end portions 12,13,14 . . . of the optical fibers of the optical fiber ribbon over the part of their lengths between the inclined support and the clamping device 23 lie in an unsupported smooth catenary curve 32 whose centres of curvature lies on a line extending transversely of the length of optical fiber ribbon (see FIG. 1).

Figure 2:
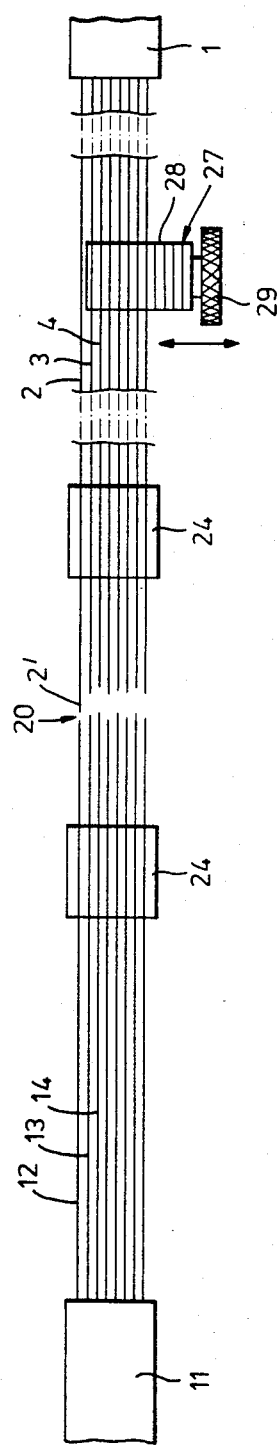

The helically grooved rod 27 is then unscrewed incrementally in such a direction that the exposed end portion 2 of an outermost optical fiber of the length of optical fiber ribbon 1 falls off the free end of the rod and adopts a straight and rectilinear path so that its end 2' to be fusion spliced protrudes beyond the ends of the exposed end portions 3,4 . . . of the other optical fibers of the optical fiber ribbon 1 (see FIG. 2). The protruding end 2' of the exposed end portion 2 is then arranged in accurate axial alignment with and with its end face abutting the end face of the exposed end portion 12 of the corresponding optical fiber of the optical fiber ribbon 11 and a fusion splice is effected between the abutting ends of the aligned optical fibers by means of the electrodes 21. This sequence of steps is then repeated for each immediately adjacent pair of exposed end portions 3,4, . . . and 13,14 . . . of optical fibers of the lengths of optical fiber ribbon 1,11 in turn until all the optical fibers of the optical fiber ribbons have been fusion spliced.

The improved method of the present invention has the very important advantage that it provides for sequential end-to-end fusion splicing of the optical fibers of two lengths of optical fiber ribbon in such a way that each optical fiber of each ribbon is free to move lengthwise to a limited extent with respect to the other optical fibers of the ribbon and that, during fusion splicing of any pair of optical fibers of the two ribbons, the risk that any other pair of optical fibers of the ribbons will be prematurely partially fused together during such fusion splicing of said pair of optical fibers is substantially reduced.

What we claim as our invention is:

1. A method of effecting permanent end-to-end fusion spliced between the optical fibers of two lengths of optical fiber ribbon, which method comprises the steps of stripping an end portion of each length of optical fiber ribbon to provide exposed end portions of the optical fibers; arranging the exposed end portions of the optical fibers of the two lengths of optical fiber ribbon in substantially axial alignment and with the ends to be fusion spliced positioned at a fusion splicing station; so clamping the exposed end portions of the optical fibers of each length of optical fiber ribbon that the exposed end portion of each optical fiber can be caused to move lengthwise to a limited extent relative to the exposed end portions of the other optical fibers of said length of optical fiber ribbon; arranging the exposed end portions of the optical fibers of each optical fiber ribbon, over a limited length between the position at which they are so clamped and the cut back end of the optical fiber ribbon, to follow a curved path whose centers of curvature lie on a line extending transversely of said length of optical fiber ribbon; causing the exposed end portion of an outermost optical fiber of one of the lengths of optical fiber ribbon to straighten and follow a substantially rectilinear path so that its end to be fusion spliced protrudes beyond the ends of the exposed end portions of the other optical fibers of said optical fiber ribbon; arranging said protruding end of the exposed end portion of said optical fiber of said length of optical fiber ribbon in substantially axial alignment with and with its end face substantially abutting the end face of the corresponding optical fiber of the other length of optical fiber ribbon; effecting a fusion splice between the abutting ends of said aligned optical fibers; and repeating the latter three steps for each immediately adjacent pair of exposed end portions of optical fibers of said lengths of optical fiber ribbon in turn until all the optical fibers of the optical fiber ribbons have been fusion spliced.

2. A method of effecting permanent end-to-end fusion splices between the optical fibers of two lengths of optical fiber ribbon, which method comprises the steps of stripping an end portion of each length of optical fiber ribbon to provide exposed end portions of the optical fibers; arranging the exposed end portions of the optical fibers of the two lengths of optical fiber ribbon in substantially axial alignment and with the ends to be fusion spliced positioned at a fusion splicing station; so clamping the exposed end portions of the optical fibers of each length of optical fiber ribbon that the exposed end portion of each optical fiber can be caused to move lengthwise to a limited extend relative to the exposed end portions of the other optical fibers of said length of optical fiber ribbon; introducing under the exposed end portions of the optical fibers of one of the lengths of optical fiber ribbon between the position at which they are so clamped and the cut back end of the optical fiber ribbon in a direction transversely of the optical fiber ribbon an elongate member which has a convexly curved surface over and at least partially around which said exposed end portions of the optical fibers pass so that they follow a curved path whose centers of curvature lie on a line extending transversely of said length of optical fiber ribbon and which can be moved incrementally in the direction of its length and transversely of the optical fiber ribbon; arranging the exposed end portions of the optical fibers of the other length of optical fiber ribbon, over a limited length between the position at which they are so clamped and the cut back end of the optical fiber ribbon, to follow a curved path whose centers of curvature lie on a line extending transversely of said other length of optical fiber ribbon; moving said elongated member incrementally transversely of the optical fiber ribbon in such a direction that the exposed end portion of an outermost optical fiber of said one of the lengths of optical fiber ribbon drops off an end of the elongate member and adopts a substantially straight and rectilinear path so that its end to be fusion spliced protrudes beyond the ends of the exposed end portions of the other optical fibers of said one of the lengths of optical fiber ribbon; arranging said protruding end of the exposed end portion of said optical fiber of said one length of optical fiber ribbon in substantially axial alignment with and with its end face substantially abutting the end face of the corresponding optical fiber of said other length of optical fiber ribbon; effecting a fusion splice between the abutting ends of said aligned optical fibers; and repeating the latter three steps for each immediately adjacent pair of exposed end portions of optical fibers of said lengths of optical fiber ribbon in turn until all the optical fibers of the optical fiber ribbons have been fusion spliced.

3. A method as claimed in claim 2, wherein incremental movement of the elongate member in a direction transverse of said one length of optical fiber ribbon is effected by a screw threaded arrangement.

4. A method as claimed in claim 3, wherein the elongate member comprises a rod of circular cross-section having in its surface a single helically extending groove within and partially around turns of which the exposed end portions of the optical fibers of said one length of optical fiber ribbon are arranged to lie.

5. A method as claimed in claim 1, wherein clamping of the exposed end portions of the optical fibers of each optical fiber ribbon is effected by arranging for the exposed end portions to lie in a plurality of longitudinally extending substantially parallel grooves in the upper surface of a base plate of a material having a low co-efficient of friction and by retaining them therein by a spring-loaded pressure pad having a surface which engages the optical fibers and which is of a material having a low co-efficient of friction.

6. A method as claimed in claim 1, wherein the limited lengths of the exposed end portions of the optical fibers of said other length of optical fiber ribbon are caused to follow a curved path whose centres of curvature lie on a line extending transversely of the optical fiber ribbon by arranging for said limited lengths of the exposed end portions, between the position at which the exposed end portions are so clamped and the cut back end of the optical fiber ribbon, to lie in an unsupported smooth catenary curve.

7. Apparatus for use in effecting permanent end-to-end fusion splices between the optical fibers of two lengths of optical fiber ribbon, which apparatus comprises a fusion-splicing station; means adjacent to and on opposite sides of the fusion splicing station for so clamping exposed end portions of the optical fibers of each length of optical fiber ribbon that the exposed end portion of each optical fiber can be caused to move lengthwise to a limited extent radial to the exposed end portions of the other optical fibers of said length of optical fiber ribbon; an elongate member which extends transversely of an optical fiber ribbon whose optical fibers are to be clamped in one of said clamping means and which is spaced from said one clamping means on the side of the clamping means remote from the fusion-splicing station, which elongate member is movable in the direction of its length and has a convexly curved upper surface whose centers of curvature lie on a line extending substantially parallel to the longitudinal axis of the member and over and partially around which exposed end portions of the optical fibers of said length of optical fiber ribbon can pass; and means spaced from said other clamping means on the side of said other clamping means remote from the fusion-splicing station for so supporting another length of optical fiber ribbon that exposed end portions of the optical fibers of said other length of optical fiber ribbon will follow a curved path whose centers of curvature lie on a line extending substantially parallel to the longitudinal axis of said elongate member, the arrangement being such that the elongate member can be moved incrementally transversely of its associated optical fiber ribbon in such a direction that the exposed end portion of an outermost optical fiber of said length of optical fiber ribbon will drop off an end of the elongate member and will adopt a substantially straight rectilinear path so that its end to be fusion spliced wlil protrude beyond the ends of the exposed end portions of the other optical fibers of said length of optical fiber ribbon.

8. Fusion splicing apparatus as claimed in claim 7, wherein the elongate member comprises a rod of circular cross-sections having in its surface a single helically extending groove within and partially around turns of which exposed end portions of the optical fibers of said length of optical fiber ribbon can be arrnged to lie.

9. Fusion splicing apparatus as claimed in claim 7, wherein each clamping means comprises a base plate which is made of a material having a low coefficient of friction and which has in its upper surface a plurality of longitudinally extending substantially parallel grooves in which exposed end portions of the optical fibers of said length of optical fiber ribbon can be arranged to lie and, for retaining said exposed end portions in said groove, a spring-loaded pressure pad which has a surface which will engage the optical fibers and which is made of a material having a low coefficient of friction.

10. Fusion splicing apparatus as claimed in claim 9, wherein the base plate of each clamping means is made of silicon and the spring-loaded pressure pad of each clamping means is made of a rubber-like material having a surface coating of polytetrafluoroethylene.

* * * * *